United States Patent
DeLuca et al.

(10) Patent No.: US 11,205,168 B2
(45) Date of Patent: Dec. 21, 2021

(54) FRICTIONLESS MICROLOCATION DETECTION AND AUTHORIZATION

(71) Applicant: INTERNATIONAL BUSINESS MACHINES CORPORATION, Armonk, NY (US)

(72) Inventors: Lisa Seacat DeLuca, Baltimore, MD (US); Lindsay Herbert, London (GB)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 16/018,446

(22) Filed: Jun. 26, 2018

(65) Prior Publication Data

US 2019/0392419 A1    Dec. 26, 2019

(51) Int. Cl.
| | |
|---|---|
| *G06Q 20/00* | (2012.01) |
| *G06Q 20/32* | (2012.01) |
| *G06Q 20/40* | (2012.01) |
| *G06Q 20/38* | (2012.01) |

(52) U.S. Cl.
CPC ..... *G06Q 20/3224* (2013.01); *G06Q 20/3278* (2013.01); *G06Q 20/38215* (2013.01); *G06Q 20/405* (2013.01)

(58) Field of Classification Search
CPC .......... G06Q 20/3224; G06Q 20/3278; G06Q 20/38215; G06Q 20/405
USPC ......................................................... 705/44
See application file for complete search history.

(56) References Cited

U.S. PATENT DOCUMENTS

| | | | | |
|---|---|---|---|---|
| 7,752,135 | B2* | 7/2010 | Brown | G06Q 20/04 |
| | | | | 705/44 |
| 9,916,010 | B2* | 3/2018 | Harris | G06K 9/00671 |
| 10,354,239 | B1* | 7/2019 | Nguyen | G06Q 20/102 |
| 10,402,829 | B1* | 9/2019 | Baar | G06Q 20/227 |
| 10,467,615 | B1* | 11/2019 | Omojola | G06Q 20/32 |

(Continued)

FOREIGN PATENT DOCUMENTS

| | | | |
|---|---|---|---|
| AU | 2015100708 A | 7/2015 | |
| AU | 2015100708 A4 * | 7/2015 | ........... G06Q 20/405 |
| CN | 106034024 A | 10/2016 | |

OTHER PUBLICATIONS

Title: Location-based Authentication and Authorization Using Smart Phones Authors: Feng Zhang, Aron Kondoro, Sead Muftic Date: 2012 Publisher: IEEE (Year: 2012).*

(Continued)

*Primary Examiner* — Christopher Bridges
*Assistant Examiner* — Yongsik Park
(74) *Attorney, Agent, or Firm* — Schmeiser, Olsen & Watts; Stephanie Carusillo

(57) ABSTRACT

A method and system for improving a frictionless authorization process is provided. The method includes first detecting a mobile device of a first user at first micro locations within a retail entity. Additionally, the mobile device is additionally detected entering a first check out lane of the retail entity for purchase of first items from the retail entity. The user is authorized for purchase of the first items from the retail entity and attributes associated with the previous detections with respect to the authorization are analyzed. Resulting future authorization attributes for authorizing the mobile device for future purchases of items from the retail entity are determined.

25 Claims, 8 Drawing Sheets

(56) References Cited

U.S. PATENT DOCUMENTS

| | | | | |
|---|---|---|---|---|
| 2006/0165060 | A1* | 7/2006 | Dua | G06Q 20/325 |
| | | | | 370/352 |
| 2011/0178862 | A1* | 7/2011 | Daigle | G06Q 30/06 |
| | | | | 705/14.27 |
| 2012/0101887 | A1* | 4/2012 | Harvey | G06Q 30/0241 |
| | | | | 705/14.23 |
| 2013/0132184 | A1 | 5/2013 | Mutha | |
| 2014/0222539 | A1* | 8/2014 | Scholz | G06Q 30/0226 |
| | | | | 705/14.27 |
| 2014/0324615 | A1* | 10/2014 | Kulkarni | G06Q 30/02 |
| | | | | 705/26.1 |
| 2015/0254632 | A1* | 9/2015 | Shin | G06Q 20/327 |
| | | | | 705/14.23 |
| 2016/0092864 | A1* | 3/2016 | Evans | G06Q 30/04 |
| | | | | 705/40 |
| 2016/0171566 | A1* | 6/2016 | Pugh | G06Q 30/0281 |
| | | | | 705/346 |
| 2016/0260084 | A1* | 9/2016 | Main | G06Q 20/322 |
| 2016/0371662 | A1* | 12/2016 | Fine | G06Q 30/0201 |
| 2017/0046767 | A1 | 2/2017 | Xiao | |
| 2017/0163655 | A1* | 6/2017 | Ramalingam | G06Q 20/34 |
| 2017/0193498 | A1* | 7/2017 | Metral | G06Q 20/401 |
| 2017/0316417 | A1* | 11/2017 | Wang | G06Q 20/12 |
| 2018/0018335 | A1* | 1/2018 | Wang | G06F 16/24578 |
| 2018/0018593 | A1* | 1/2018 | Benavides | G08B 21/0288 |
| 2019/0019193 | A1* | 1/2019 | Isaiah | G06Q 20/3821 |
| 2019/0114643 | A1* | 4/2019 | Dewitt | G06Q 20/384 |
| 2019/0147426 | A1* | 5/2019 | Kieffer | H04W 4/80 |
| | | | | 705/17 |
| 2019/0311339 | A1* | 10/2019 | Nguyen | G06Q 30/04 |
| 2020/0134658 | A1* | 4/2020 | Sadeghpour | G06Q 10/1097 |
| 2020/0160374 | A1* | 5/2020 | Cooksey | G06Q 30/0269 |
| 2020/0356983 | A1* | 11/2020 | Yang | G06Q 20/352 |

OTHER PUBLICATIONS

Notification of Transmittal of the International Search Report and the Written Opinion of the International Searching Authority, of the Declaration; dated Nov. 5, 2019; PCT/IB2019/055208; filing date Jun. 20, 2019; 10 pages.

YouTube; Introducing Amazon Go and the world's most advanced shopping technology; https://www.youtube.com/watch?v=NrmMk1Myrxc; Dec. 5, 2016; 3 pages.

Well, Peter et al.; "The NIST Definition of Cloud Computing;" National Institute of Standards and Technology; Special Publication 800-145; Sep. 2011; 7 pages.

* cited by examiner

FRICTIONLESS MICROLOCATION DETECTION AND AUTHORIZATION

FIELD

The present invention relates generally to a method for increasing a security level associated with frictionless transactions and in particular to a method and associated system for improving micro-location detection hardware and software technology associated with detecting user and device attributes and authorizing transactions based on micro-location detection thereby improving an efficiency associated with frictionless transactions.

BACKGROUND

Processes for enabling frictionless transactions are well known. A large number of solutions currently exist with respect to allowing customers to use phones and associated applications for to enable transactions without the need for using a credit card. However, the aforementioned transactions rely on a user physically enabling a device. Likewise, current solutions use sensors and video files for determining user actions. Additionally, Bluetooth technology may be used for determining user proximity process a payment as a user proceeds through a checkout area.

However, the aforementioned solutions require a position of a mobile device to be determined to implement an authorization process. Likewise, multiple checkout areas within a retail location enable a frequent shopper to use a same exit or a favorite checkout aisle during visits to the retail location. As frictionless transactions grow in popularity, it may be common for beacons to be placed at various checkout areas to process payments on behalf of a user.

Accordingly, there exists a need in the art to provide an increased security means for frictionless pay based on authorized micro locations with respect to a user's favorite checkout aisle or exit.

SUMMARY

A first aspect of the invention provides a frictionless authorization improvement method comprising: first detecting, by a processor of a hardware device, a mobile device of a first user at first micro locations within a retail entity; second detecting at a first date and time, by the processor, the mobile device of the first user entering a first check out lane of the retail entity for purchase of first items from the retail entity; first authorizing, by the processor in response to user input, the first user for the purchase of the first items from the retail entity; analyzing, by the processor, attributes associated with the first detecting, the second detecting, and the first authorizing; and determining, by the processor based on results of the analyzing, future authorization attributes for authorizing the mobile device of the first user for future purchases of items from the retail entity.

A second aspect of the invention provides a frictionless authorization improvement method comprising: first detecting, by a processor of a hardware device, a mobile device of a first user at a retail entity; second detecting at a first date and time, by the processor, the mobile device of the first user entering a first check out lane of the retail entity for purchase of first items from the retail entity; third detecting at the first date and time, by the processor via an accelerometer of the mobile device, a height of the first user; first authorizing, by the processor in response to user input, the first user for the purchase of the first items from the retail entity; analyzing, by the processor, attributes associated with the first detecting, the second detecting, the third and the first authorizing; and determining, by the processor based on results of the analyzing, future authorization attributes for authorizing the mobile device of the first user for future purchases of items from the retail entity.

A third aspect of the invention provides computer program product, comprising a computer readable hardware storage device storing a computer readable program code, the computer readable program code comprising an algorithm that when executed by a processor of a hardware device implements a frictionless authorization improvement method, the method comprising: first detecting, by the processor, a mobile device of a first user at first micro locations within a retail entity; second detecting at a first date and time, by the processor, the mobile device of the first user entering a first check out lane of the retail entity for purchase of first items from the retail entity; first authorizing, by the processor in response to user input, the first user for the purchase of the first items from the retail entity; analyzing, by the processor, attributes associated with the first detecting, the second detecting, and the first authorizing; and determining, by the processor based on results of the analyzing, future authorization attributes for authorizing the mobile device of the first user for future purchases of items from the retail entity.

A fourth aspect of the invention provides a f hardware device comprising a processor coupled to a computer-readable memory unit, the memory unit comprising instructions that when executed by the computer processor implements a frictionless authorization improvement method comprising: first detecting, by the processor, a mobile device of a first user at first micro locations within a retail entity; second detecting at a first date and time, by the processor, the mobile device of the first user entering a first check out lane of the retail entity for purchase of first items from the retail entity; first authorizing, by the processor in response to user input, the first user for the purchase of the first items from the retail entity; analyzing, by the processor, attributes associated with the first detecting, the second detecting, and the first authorizing; and determining, by the processor based on results of the analyzing, future authorization attributes for authorizing the mobile device of the first user for future purchases of items from the retail entity.

A fifth aspect of the invention provides a computer program product, comprising a computer readable hardware storage device storing a computer readable program code, the computer readable program code comprising an algorithm that when executed by a processor of a hardware device implements a frictionless authorization improvement method, the method comprising: first detecting, by the processor of a hardware device, a mobile device of a first user at a retail entity; second detecting at a first date and time, by the processor, the mobile device of the first user entering a first check out lane of the retail entity for purchase of first items from the retail entity; third detecting at the first date and time, by the processor via an accelerometer of the mobile device, a height of the first user; first authorizing, by the processor in response to user input, the first user for the purchase of the first items from the retail entity; analyzing, by the processor, attributes associated with the first detecting, the second detecting, the third and the first authorizing; and determining, by the processor based on results of the analyzing, future authorization attributes for authorizing the mobile device of the first user for future purchases of items from the retail entity.

The present invention advantageously provides a simple method and associated system capable of providing an increased security means for frictionless pay based on authorized micro locations.

DETAILED DESCRIPTION

Figure 1:
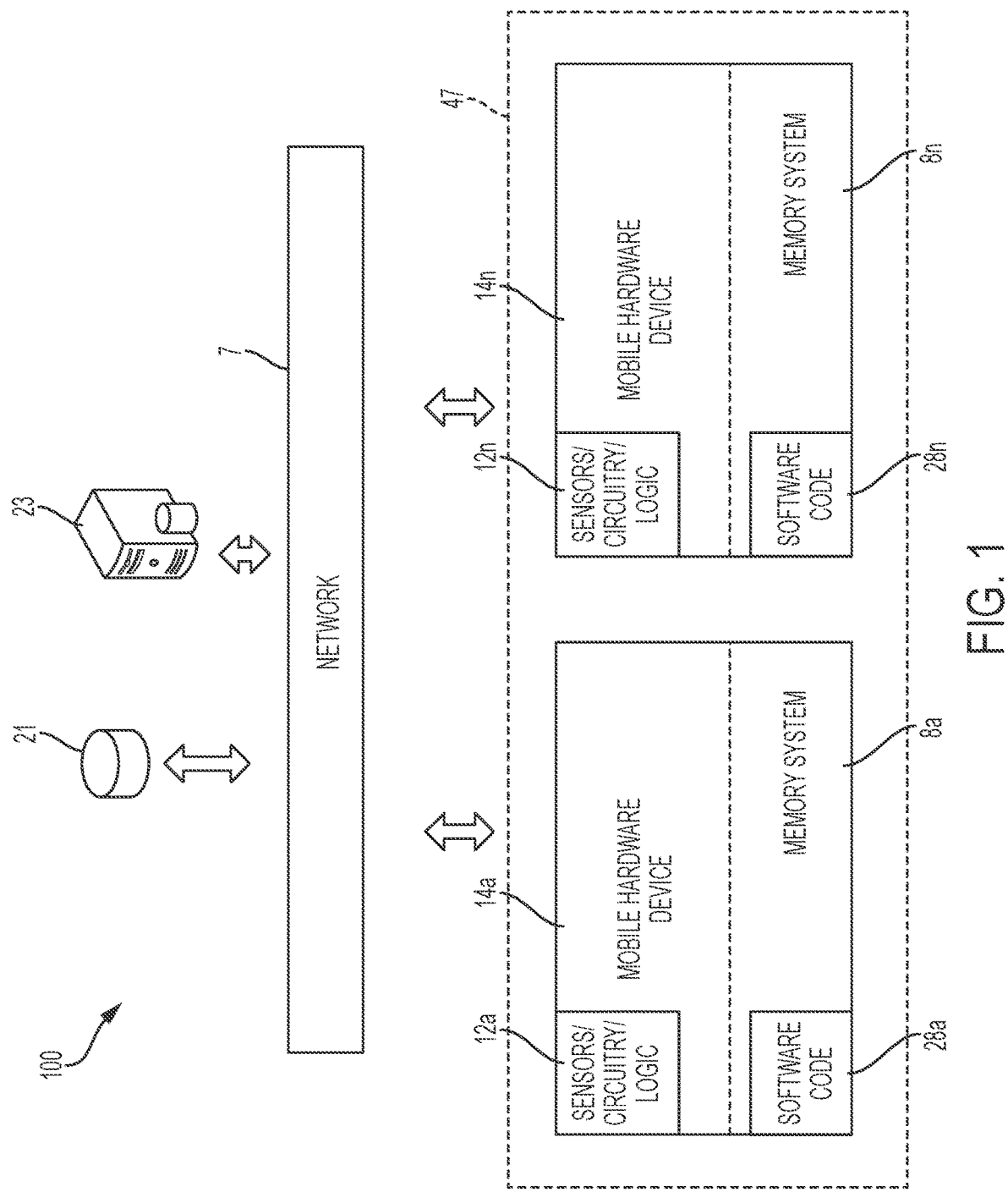
FIG. 1 illustrates a system for improving micro-location detection hardware and software technology associated with detecting user and device attributes and authorizing transactions based on micro-location detection, in accordance with embodiments of the present invention.

FIG. 1 illustrates a system 100 for improving micro-location detection hardware and software technology associated with detecting user and device attributes and authorizing transactions based on micro-location detection, in accordance with embodiments of the present invention. System 100 is enabled to associate a user with a micro-location (within a venue enabled with frictionless transaction technology) during a first transaction based on a user's device and successful execution of the first transaction. Additionally, system 100 is enabled to detect that the user is attempting an additional transaction at a different micro-location within the venue. In response, a notification indicating a preferred micro-location is transmitted to a server. Alternatively, the user is prompted to enter transaction authentication data including, inter alia, biometrics authentication, retinal authentication, fingerprint authentication, etc. The differing micro-location may be updated in a user profile of the user. If it is determined that the user's device is not in possession of the user, one or more security responses may be activated.

Previous auto transaction processes require the use of manual passwords or device geographical location technology. In contrast, system 100 enables an improved process for enabling frictionless transaction technology associated with determined micro-locations as follows:

During a first time period, an association between a user and a physical location (of a specific checkout kiosk within a venue) is generated based on a presence of a device associated with the user and a successful execution of a first transaction at the specific checkout kiosk (requiring a verification of the identity of the user). Likewise, during a subsequent time period and responsive to a determination that the device has entered a proximity with respect to the specific checkout kiosk, a second transaction is authorized and processed based on: a location of the device with respect to a specific checkout kiosk within the venue, an association of the user with the specific checkout kiosk, and the verification of the identity of the user during an initial visit to the venue. The specific checkout kiosk may be designated as a preferred checkout location of the user based on a pattern of use by the user and a profile of the user may be updated accordingly. Additionally (in response to a determination that the device associated with the user has entered a proximity to a given checkout kiosk) a notification may be transmitted to an account associated with the user. The notification may indicate: a presence of the device at the given checkout kiosk and a previously used checkout kiosk (used by the user) differing from the given checkout kiosk. A mobile device of an additional user (of a group of individuals including the user) may be additionally identified and the aforementioned notification may be transmitted to the mobile device of the additional user. The additional user may be located within a specified proximity to the (original) user. If the (original) user is not in position of the device, one or more security responses may be activated. Security responses may include: generating and transmitting (to an authority agency) a notification indicating that the device is not in possession of the user; transmitting (to an authority agency, the user, the additional user, etc.) a command to the device associated with the user for activating a transmission indicating a location of the device; transmitting a message to the device associated with the user for deactivating at least one function of the device associated with the user; and transmitting a command to the device associated with the user for activating a function of the device for indicating a current location of the device. The function may include, inter alia, enabling the device to emit an audio signal and/or a visual signal discernable within a threshold distance to the device. System 100 further enables a current pattern of movement of the mobile device in the venue to be compared to previous patterns of movement of the device in the venue and an associated notification (responsive to a determination that the current pattern of movement violates one or more movement parameters based on previous patterns of movement of the user) may be transmitted to an account associated with the user and/or a group of individuals including the user. The associated notification may indicate a pattern of movement of the device and provide an option to activate one or more security responses.

System 100 of FIG. 1 includes server hardware device (or hardware system) 23 and a database system 21 connected through a network 7 to mobile hardware devices 14a . . . 14n. Mobile hardware device 14a comprises sensors/circuitry/logic 12a and a (specialized) memory system 8a. Memory system 8a comprises software code 28a. Memory system 8a may include a single memory system. Alternatively, memory system 8a may include a plurality of memory systems. Mobile hardware device 14n comprises sensors/circuitry/logic 12n and a (specialized) memory system 8n. Memory system 8n comprises software code 28n. Memory system 8n may include a single memory system. Alternatively, memory system 8n may include a plurality of memory systems. Server hardware device 23, database system 21, and mobile hardware devices 14a . . . 14n each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, notification server hardware device 23, database system 21, and mobile hardware devices 14a . . . 14n may each comprise a specialized hardware device comprising specialized (non-generic) hardware and circuitry (i.e., specialized discrete non-generic analog, digital, and logic based circuitry) for (independently or in combination) executing a process described with respect to FIGS. 1-8. The specialized discrete non-generic analog, digital, and logic based circuitry (e.g., sensors/circuitry/logic 12a . . . 12n, etc.) may include proprietary specially designed components (e.g., a specialized integrated circuit, such as for example an Application Specific Integrated Circuit (ASIC) designed for only implementing an automated process for improving micro-location detection hardware and software technology associated with detecting user and device attributes and authorizing transactions based on micro-location detection. Sensors/circuitry/logic 12 may include any type of internal or external sensors including, inter alia, GPS sensors, activity tracking sensors, social network code based sensors, a heart rate monitor, a blood pressure monitor, a temperature sensor, a pulse rate monitor, an ultrasonic sensor, an optical sensor, a video retrieval device, humidity sensors, voltage sensors, network traffic sensors, fingerprint detectors, retinal scan sensors, facial recognition sensors, biometric scanners, etc. Network 7 may include any type of network including, inter alia, a local area network, (LAN), a wide area network (WAN), the Internet, a wireless network, etc.

Figure 2:
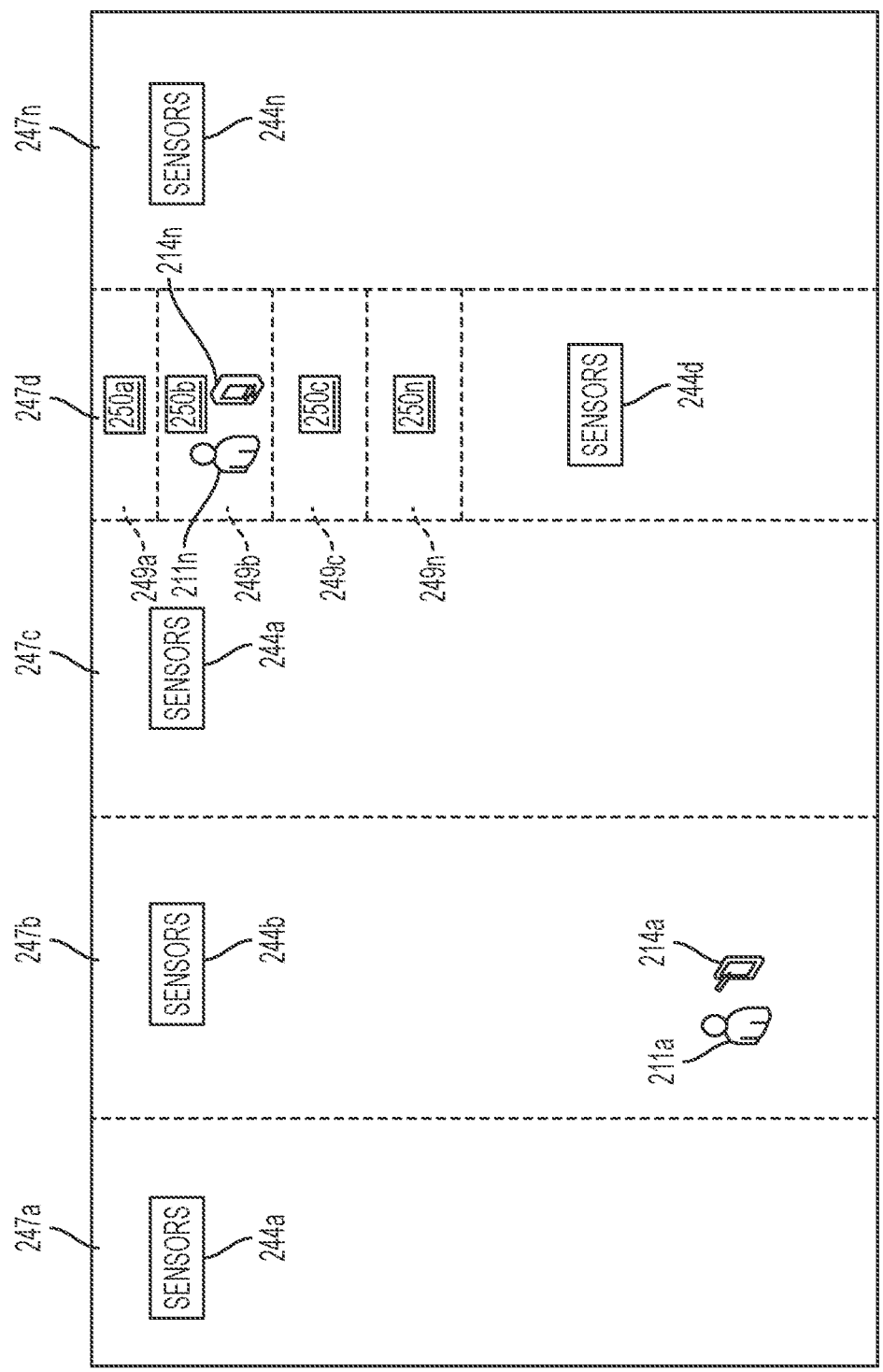
FIG. 2 illustrates a venue comprising micro-locations for improving micro-location detection hardware and software technology associated with detecting user and device attributes and authorizing frictionless transactions based on micro-location detection, in accordance with embodiments of the present invention.

FIG. 2 illustrates a venue 247 comprising micro-locations 247a . . . 247n for improving micro-location detection hardware and software technology associated with detecting user and device attributes and authorizing frictionless transactions based on micro-location detection, in accordance with embodiments of the present invention. Venue 247 may comprise a retail location structure (e.g., a building) divided into sections (e.g., micro-locations 247a . . . 247n) each including associated sensors 244a . . . 244n for detecting users and associated hardware devices. Micro-location 247a may be associated with an entrance to venue 247. Micro-location 247n may be associated with an exit from venue 247. Micro-location 247b comprises a detected user 211a and an associated device 214. Micro-location 247d comprises (frictionless pay) checkout aisles 249a . . . 249n. Each of checkout aisles 249a . . . 249n comprises sensors 250a . . . 250n, respectively. Checkout aisle 249b comprises a user 211n checking out items 261 for purchase. Sensors 244a . . . 244n and sensors 250a . . . 250n may include, inter alia, Bluetooth beacons, cameras, Wi-Fi points, etc. The system illustrated in venue 247 enables the following implementation process for improving a frictionless pay system:

The process is initiated when user 211a checks out for a first time at checkout aisle 249b and is presented with steps for authorizing checkout aisle 249b. The authorization steps are executed via usage of technologies such as, inter alia, multifactor identification processes, fingerprint/retinal/facial/biometric scanning processes, pin entry processes, etc. Subsequently, when user 211n requests a transaction (at a subsequent time) via checkout aisle 249b again, a user implemented authorization is not necessary and the transaction is processed immediately without user 211n initializing the process. Likewise, if user 211n exits venue 247 (for completion of another transaction at a future point in time) from a different checkout aisle (e.g., checkout aisle 249c) additional authorization processes are required via usage of technologies such as, inter alia, multifactor identification processes, fingerprint/retinal/facial/biometric scanning processes, pin entry processes, etc. If the additional user authorization processes result in the user being authorized for transactions via the different checkout aisle (e.g., checkout aisle 249c), the different checkout aisle is added to a list of authorized checkout point aisles and may be designated as a primary checkout aisle such that future exits from the different checkout aisle checkout will not trigger additional authorization processes. If the additional user authorization processes result in user 211n not being authorized for transactions via the different checkout aisle, user 211n is alerted (e.g., via a mobile push message, a text message, an email, etc.) and user 211a is prompted to use a backup form of payment and all other checkout aisles are locked (for a specified time period) from frictionless autopay until an authorization process is successfully executed.

Figure 3:
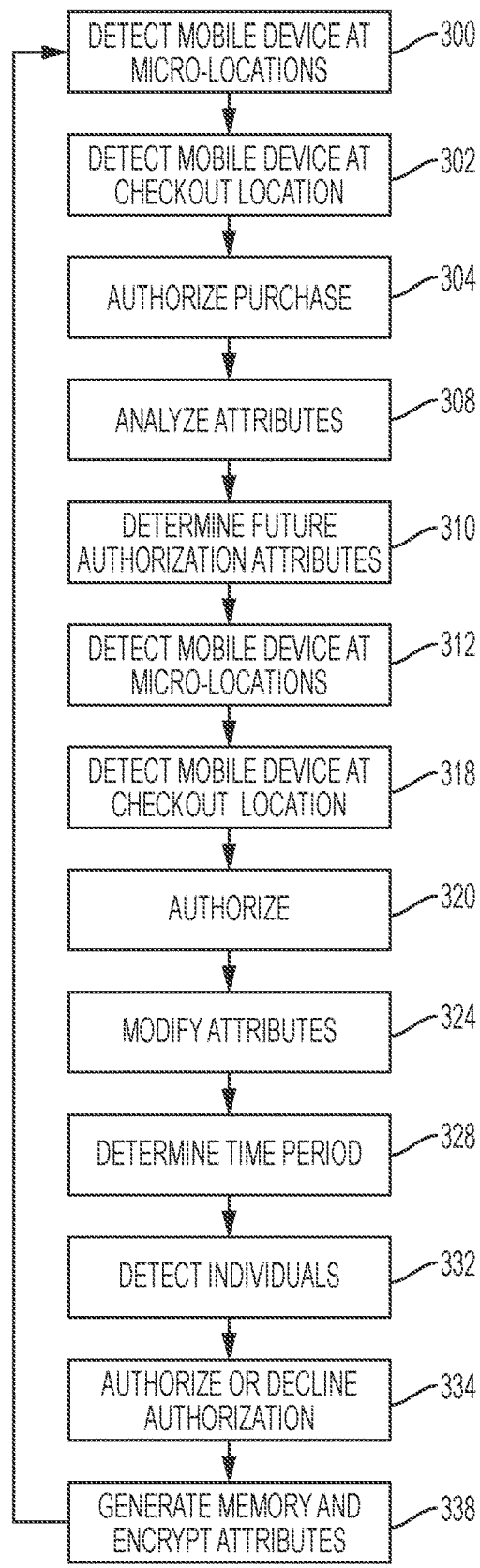
FIG. 3 illustrates an algorithm detailing a process flow enabled by the system of FIG. 1 for improving micro-location detection hardware and software technology associated with detecting user and device attributes and authorizing transactions based on micro-location detection, in accordance with embodiments of the present invention.

FIG. 3 illustrates an algorithm detailing a process flow enabled by system 100 of FIG. 1 for improving micro-location detection hardware and software technology associated with detecting user and device attributes and authorizing transactions based on micro-location detection, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by server hardware device 23, database system 21, and mobile hardware devices 14a . . . 14n of FIG. 1. In step 300, a mobile device of a first user is detected at first micro locations within a retail entity structure. In step 302, the mobile device of the first user is detected entering a first check-out lane of the retail entity for purchase of first items from the retail entity. In step 304, the first user is authorized (based on user input such as, inter alia, user fingerprint input, user retinal scan input, user facial recognition input, user biometric scanning input, user identification code input, user password/PIN entry input, etc.) for purchase of the first items from the retail entity. In step 308, attributes associated with the processes of steps 300-304 are analyzed. In step 310, future authorization attributes for authorizing the mobile device of the first user for future purchases of items from the retail entity are determined based on results of the analysis of step 308. In step 312, the mobile device of the first user is detected at the first or second micro locations (at a differing time from step 300) within the retail entity. In step 318, the mobile device of the first user is detected entering the first or second check-out lane (at a differing time from step 302) of the retail entity for purchase of second items from the retail entity. In step 320, the first user is authorized for purchase of the second items (from the first or second checkout-lane) from the retail entity based on past authorization attributes with respect to results of steps 312 and 318. In step 324, future authorization attributes are modified (in accordance with results of steps 312 and 318) resulting in modified future authorization attributes. In step 328, a time period elapsed since determining the future authorization attributes of step 310 is determined. The time period is compared to a predetermined threshold time period. If results of the comparison indicate that the time period is less that the predetermined threshold time period, then the first user is authorized for purchase of the second items from the retail entity. If results of the comparison indicate that the time period exceeds the predetermined threshold time period, then the first user may be authorized or declined for purchase of the second items from the retail entity based on additional authorizations. In step 332, the mobile device of the first user is detected at the first micro locations within the retail entity. The user may be detected with or without additional individuals previously associated with the first user and the first checkout lane. In step 334, authorization or deauthorization for the first user to purchase items from the retail entity is executed based on the additional individuals being present. In step 338, a specialized memory repository is generated within a specified portion of a hardware memory device of the hardware device. The future authorization attributes (of step 310) are stored within the specialized memory repository. The future authorization attributes may be encrypted prior to storing within the specialized memory repository. The encrypted future authorization attributes may be transmitted to server devices associated with the retail entity.

Figure 4:
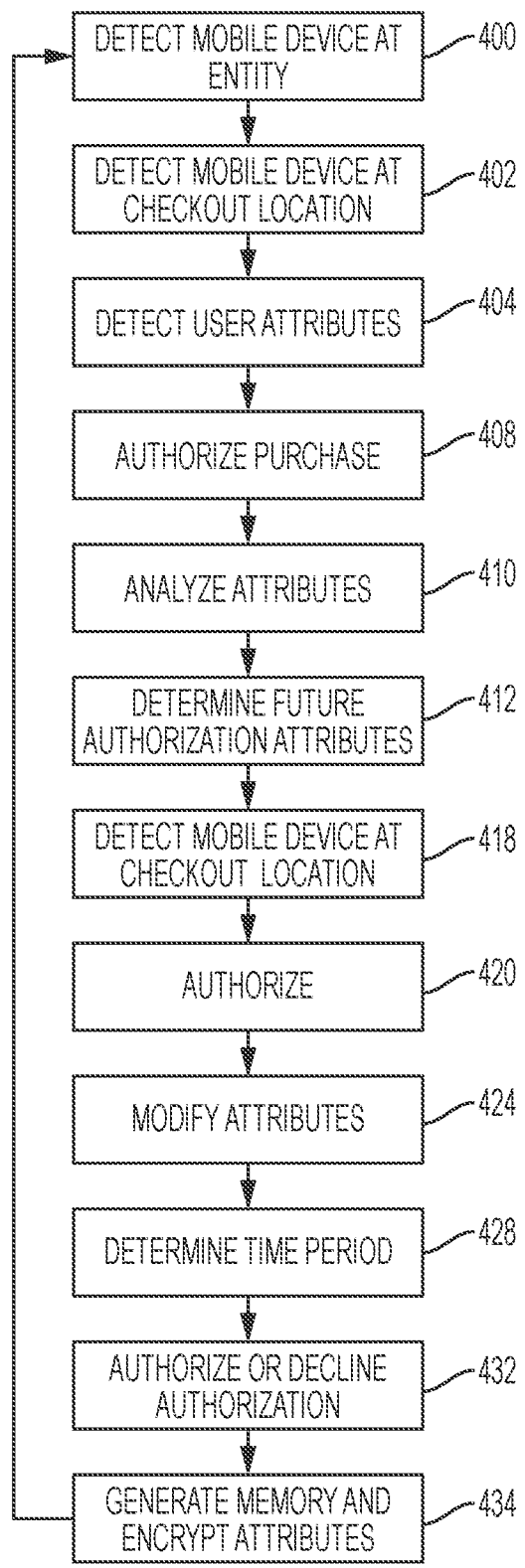
FIG. 4 illustrates an alternative algorithm detailing a process flow enabled by the system of FIG. 1 for improving micro-location detection hardware and software technology associated with detecting user and device attributes and authorizing transactions based on micro-location detection, in accordance with embodiments of the present invention.

FIG. 4 illustrates an alternative algorithm detailing a process flow enabled by system 100 of FIG. 1 for improving micro-location detection hardware and software technology associated with detecting user and device attributes and authorizing transactions based on micro-location detection, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed in combination by server hardware device 23, database system 21, and mobile hardware devices 14a . . . 14n of FIG. 1. In step 400, a mobile device of a first user is detected at first micro locations within a retail entity structure. In step 402, the mobile device of the first user is detected entering a first check-out lane of the retail entity for purchase of first items from the retail entity. In step 404, attributes (e.g., a height of the first user, a heartrate of the first user, eye or hair color of the first user, etc.) of the first user are detected via a sensor device of the mobile device. For example, a height of the first user may be determined via an accelerometer of the mobile device. In step 408, the first user is authorized (based on user input such as, inter alia, user fingerprint input, user retinal scan input, user facial recognition input, user biometric scanning input, user identification code input, user password/PIN entry input, etc.) for purchase of the first items from the retail entity. In step 410, attributes associated with the processes of steps 400-408 are analyzed. In step 412, future authorization attributes for authorizing the mobile device of the first user for future purchases of items from the retail entity are determined based on results of the analysis of step 410. In step 418, the mobile device of the first user is detected entering the first or second check-out lane (at a differing time from step 402) of the retail entity for purchase of second items from the retail entity. In step 420, the first user is authorized for purchase of the second items (from the first or second checkout-lane) from the retail entity based on past authorization attributes with respect to results of steps 410-418. In step 424, future authorization attributes are modified (in accordance with results of steps 410-418) resulting in modified future authorization attributes. In step 428, a time period elapsed since determining the future authorization attributes of step 312 is determined. The time period is compared to a predetermined threshold time period. If results of the comparison indicate that the time period is less that the predetermined threshold time period, then the first user is authorized, in step 432, for purchase of the second items from the retail entity. If results of the comparison indicate that the time period exceeds the predetermined threshold time period, then the first user may be authorized or declined, in step 432, for purchase of the second items from the retail entity based on additional authorizations. In step 434, a specialized memory repository is generated within a specified portion of a hardware memory device of the hardware device. The future authorization attributes (of step 412) are stored within the specialized memory repository. The future authorization attributes may be encrypted prior to storing within the specialized memory repository. The encrypted future authorization attributes may be transmitted to server devices associated with the retail entity.

Figure 5:
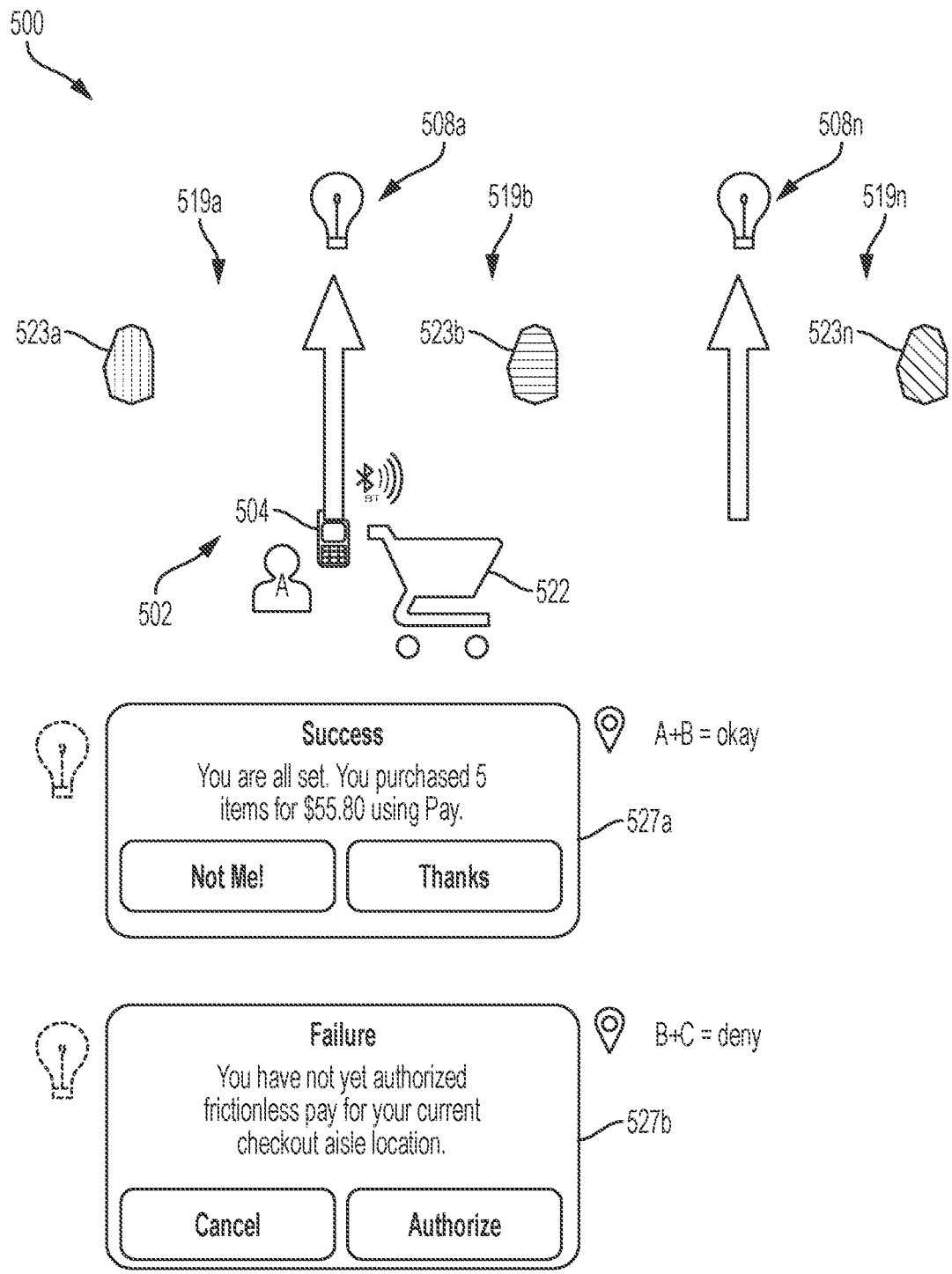
FIG. 5 illustrates an implementation example enabling a system for improving micro-location detection hardware and software technology associated with detecting user and device attributes and authorizing transactions based on micro-location detection, in accordance with embodiments of the present invention

FIG. 5 illustrates an implementation example enabling a system 500 for improving micro-location detection hardware and software technology associated with detecting user and device attributes and authorizing transactions based on micro-location detection, in accordance with embodiments of the present invention. The example illustrated in FIG. 5 is enabled by a user 502 shopping at his/her favorite retail store. The retail store is equipped (with specified hardware and software 508a . . . 508n) for frictionless payments. Additionally, the retail store includes a plurality of zones 519a . . . 519n defined by Bluetooth beacons 523a . . . 523n (communicating with mobile device 504) to determine the user's 502 micro location within zones 519a . . . 519n. The user initiates motion (with mobile device 504 and a shopping cart 522) between beacons 523a and 523b (i.e., his/her favorite checkout aisle) and authorizes the associated micro location (within zone 519b) to accept payment. Therefore, each time user 502 enables a frictionless pay process at this location a green indicator light and associated GUI 527a is presented to the user 502 to illustrate that he/she has successfully completed a purchase. Likewise, user 502 has not authorized an aisle between beacons 523b and 523n (for frictionless pay) as user 502 never accesses this aisle. Therefore, the following process is initiated in response to the user's mobile device 504 being possessed by another user B as the user B attempts to access the frictionless pay system at the retail store. The user B walks through the aisle in zone 519n defined by beacons 523b and 523n (to attempt to complete a purchase) and the mobile device 504 issues an error notification via GUI 527b indicating that they are not authorized to complete a payment. Likewise, if the user B attempts exit through zone 519b they would have to fill out additional security details to prove they are user 502.

Figure 6:
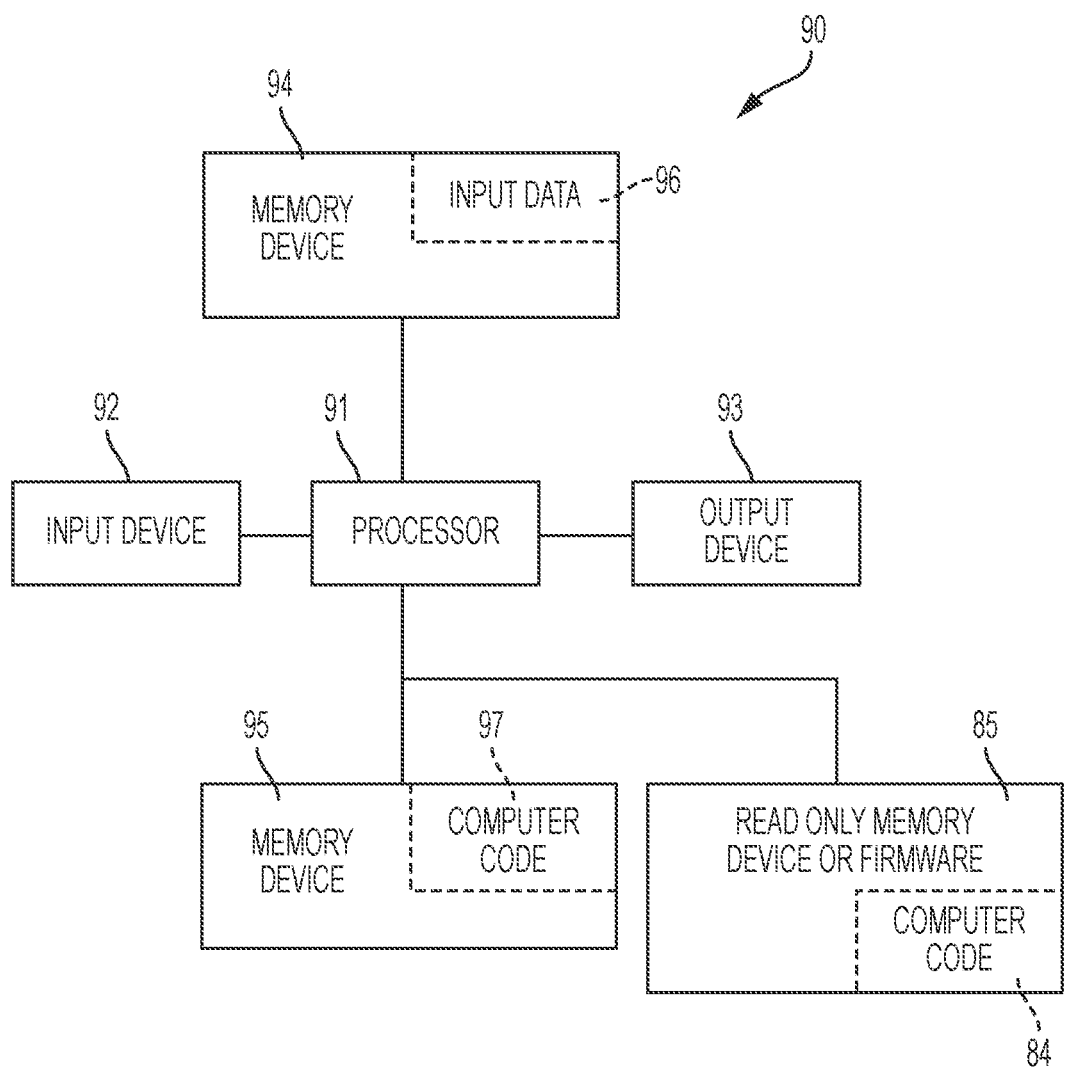
FIG. 6 illustrates a computer system used by the system of FIG. 1 for improving micro-location detection hardware and software technology associated with detecting user and device attributes and authorizing transactions based on micro-location detection, in accordance with embodiments of the present invention.

FIG. 6 illustrates a computer system 90 (e.g., server hardware device 23, database system 21, and mobile hardware devices 14a . . . 14n of FIG. 1) used by or comprised by the system of FIG. 1 for improving micro-location detection hardware and software technology associated with detecting user and device attributes and authorizing transactions based on micro-location detection, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for improving micro-location detection hardware and software technology associated with detecting user and device attributes and authorizing transactions based on micro-location detection. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 3 and 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve micro-location detection hardware and software technology associated with detecting user and device attributes and authorizing transactions based on micro-location detection. Thus, the present invention discloses a process for deploying, creating, integrating, hosting, maintaining, and/or integrating computer-readable code into the computer system 90, wherein the code in combination with the computer system 90 is capable of performing a method for enabling a process for improving micro-location detection hardware and software technology associated with detecting user and device attributes and authorizing transactions based on micro-location detection. In another embodiment, the invention provides a business method that performs the process steps of the invention on a subscription, advertising, and/or fee basis. That is, a service supplier, such as a Solution Integrator, could offer to enable a process for improving micro-location detection hardware and software technology associated with detecting user and device attributes and authorizing transactions based on micro-location detection. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
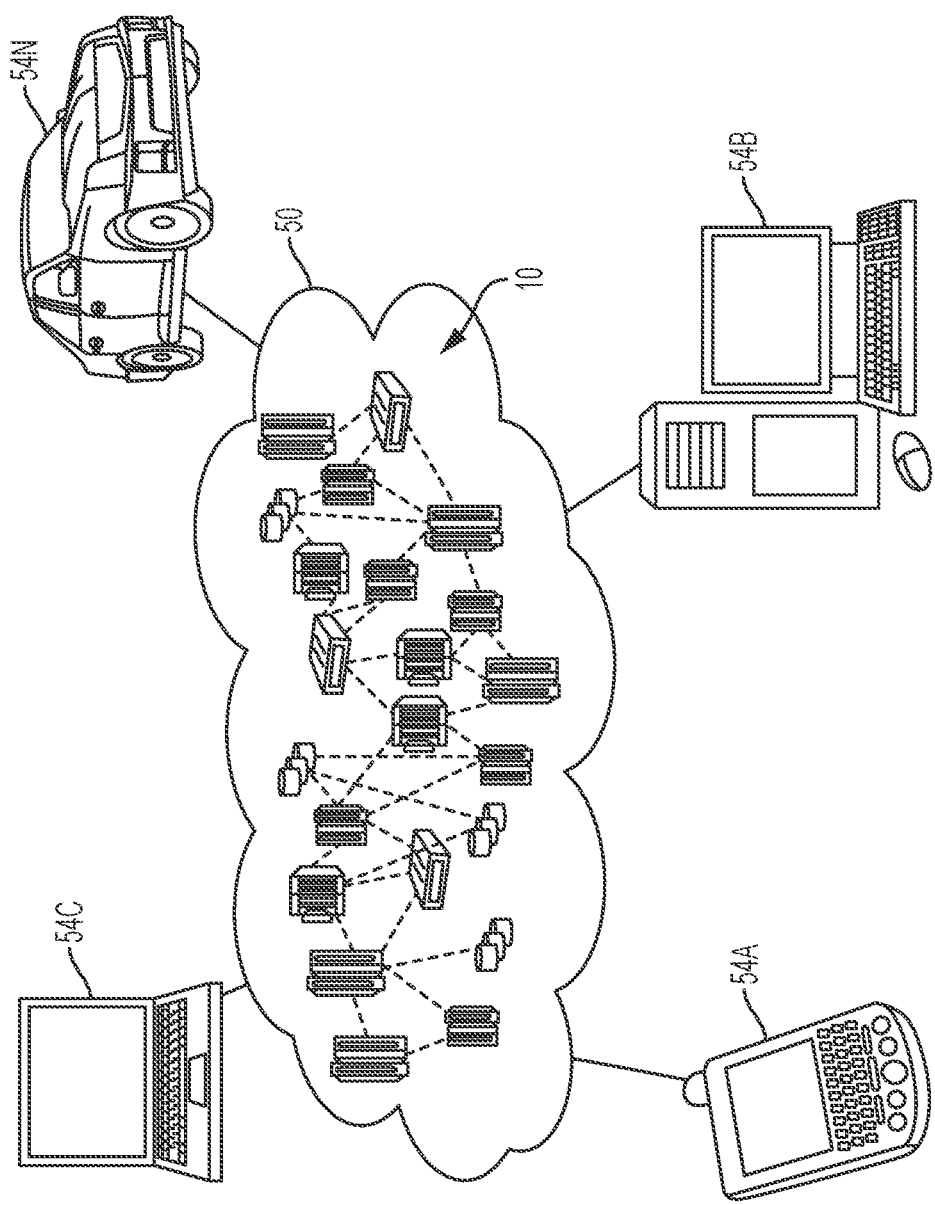
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 8:
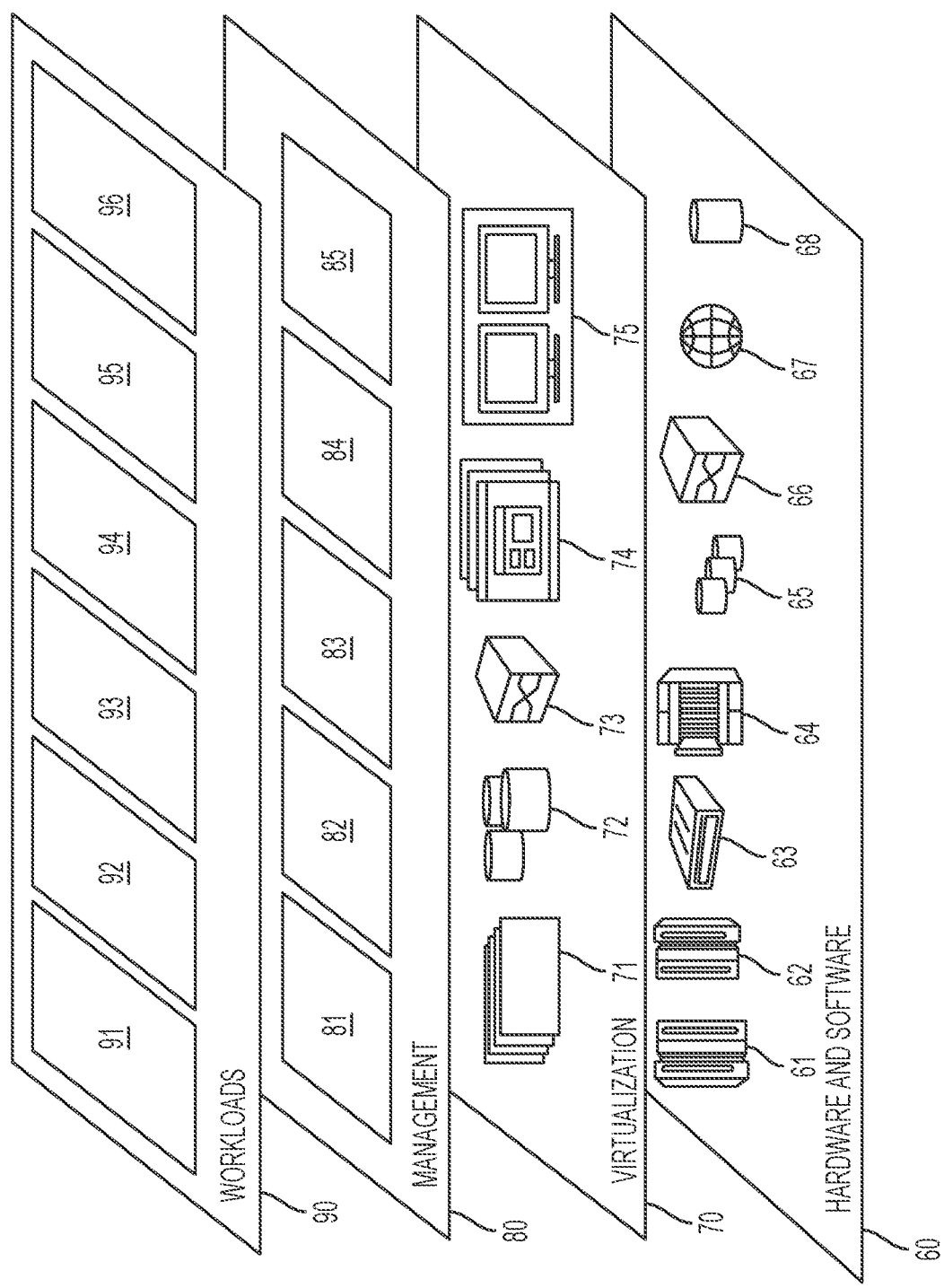
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving micro-location detection hardware and software technology associated with detecting user and device attributes and authorizing transactions based on micro-location detection 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A frictionless authorization improvement method comprising:

first detecting, by a processor of a hardware device via Bluetooth beacons enabled by Bluetooth sensors, a mobile device of a first user at first micro locations within an entity, wherein said first micro locations comprise a first location associated with a first check out lane of said entity and a second location associated with an entrance of said entity, and wherein said first micro locations comprise specialized hardware and software configured to implement frictionless authorization processes;

second detecting at a first date and time, by said processor, said mobile device of said first user entering said first check out lane of said entity for a transaction associated with first items from said entity;

detecting, by said processor via a retinal scan sensor, retinal authentication information retrieved from a retinal scan of said first user;

detecting, by said processor via a fingerprint detection sensor, fingerprint authentication information retrieved from a fingerprint scan of said first user;

first authorizing, by said processor in response to said retinal authentication information, said fingerprint authentication information, and biometric user input received via a plurality of biometric sensors, said first user for said transaction associated with said first items from said entity;

analyzing, by said processor, attributes associated with said first detecting, said second detecting, and said first authorizing;

determining, by said processor based on results of said analyzing, future authorization attributes for authorizing said mobile device of said first user for future transactions associated with items from said entity, wherein said future authorization attributes are associated with multifactor identification hardware sensor implemented processes;

generating, by said processor, a specialized memory repository within a specified portion of a hardware memory device of said mobile device;

encrypting, by said processor, said future authorization attributes resulting in encrypted future authorization attributes;

storing within said specialized memory repository, by said processor, said encrypted future authorization attributes;

detecting, by said processor via a plurality of wireless sensors, that said first user is not within a specified position with respect to said mobile device;

automatically deactivating, by said processor in response to results of said detecting, a hardware function of said mobile device;

activating, by said processor in response to said automatically deactivating, a function causing said mobile device to automatically emit an audio signal discernable within a threshold distance to said mobile device;

transmitting, by said processor in response to said automatically deactivating, a transmission, indicating a current location of said mobile device, to an authority entity thereby causing an individual of said authority entity to proceed to said current location determining authorization issues;

further detecting, by said processor, a current pattern of movement of said mobile device within said entity for comparison to previous patterns of movement of said mobile device within said entity;

additionally detecting, by said processor based on results of said activating and said further detecting, that said user is within a specified position with respect to said mobile device;

executing, by said processor in response to results of said activating and said additionally detecting, a process for said authorizing said mobile device of said first user for said future transactions associated with items thereby causing said first user to pass through said first micro locations within said entity and proceed to and enter said first check out lane of said entity for a transaction associated with currently selected items from said entity;

further detecting, by said processor in response to said executing, that said mobile device has entered a proximity with respect to a specified checkout kiosk;

authorizing and processing, by said processor, an additional transaction based on said proximity, an association of said user with the specified checkout kiosk, said retinal authentication information, and said fingerprint authentication information; and automatically presenting, by said processor, an indicator light and associated graphical user interface to said first user, wherein said indicator light and associated graphical user interface indicated said authorizing and processing.

2. The method of claim 1, further comprising:
third detecting, by said processor, said mobile device of said first user at said first micro locations within said entity;

fourth detecting at a second date and time, by said processor, said mobile device of said first user entering said first check out lane of said entity for said transaction associated with second items from said entity; and second authorizing, by said processor based on past authorization attributes with respect to results of said third detecting and said fourth detecting, said first user for said transaction associated with said second items from said entity.

3. The method of claim 1, further comprising:
third detecting, by said processor, said mobile device of said first user at second micro locations within a entity;

fourth detecting at a second date and time, by said processor, said mobile device of said first user entering a second check out lane of said entity for a transaction associated with second items from said entity;

second authorizing, by said processor in response to receiving said user input, said first user for said transaction associated with said second items from said entity; and third authorizing, by said processor based on results of said third detecting and said fourth detecting, said first user for said transaction associated with said second items from said entity.

4. The method of claim 3, further comprising:
modifying, by said processor based on said third authorizing, said future authorization attributes in accordance with results of said third detecting and said fourth detecting resulting in modified future authorization attributes.

5. The method of claim 1, wherein said user input selected is selected from the group consisting of user fingerprint input, user retinal scan input, user facial recognition input, user biometric scanning input, user identification code input, and user password entry input.

6. The method of claim 1, further comprising:
third detecting, by said processor, said mobile device of said first user at said first micro locations within an entity;

fourth detecting at a second date and time, by said processor, said mobile device of said first user entering said first check out lane of said entity for a transaction associated with second items from said entity;

determining, by said processor, a time period elapsed since said determining said future authorization attributes; and comparing, by said processor, said time period to a predetermined threshold time period.

7. The method of claim 6, wherein results of said comparing indicate that said time period is less than said predetermined threshold time period, and wherein said method further comprises:
second authorizing, by said processor based on said future authorization attributes with respect to results of said third detecting and said fourth detecting and said results of said comparing, said first user for said transaction associated with said second items from said entity.

8. The method of claim 6, wherein results of said comparing indicate that said time period exceeds said predetermined threshold time period, and wherein said method further comprises:
second authorizing, by said processor in response to receiving said user input, said first user for said transaction associated with said second items from said entity; and
third authorizing, by said processor based on said future authorization attributes with respect to results of said third detecting and said fourth detecting and said results of said comparing, said first user for said purchase of said second items from said entity.

9. The method of claim 6, wherein results of said comparing indicate that said time period exceeds said predetermined threshold time period, and wherein said method further comprises:
declining, by said processor based on said results of said comparing, authorization for said first user for said transaction associated with said second items from said entity.

10. The method of claim 1, further comprising:
third detecting, by said processor, said mobile device of said first user at second micro locations within an entity;
fourth detecting at a second date and time, by said processor, said mobile device of said first user entering a second check out lane of said entity for transaction associated with second items from said entity; and
declining, by said processor based on said results of said fourth detecting, authorization for said first user for said transaction associated with said second items from said entity.

11. The method of claim 1, further comprising:
third detecting, by said processor, said mobile device of said first user at said first micro locations within a entity;
fourth detecting at a second date and time, by said processor, said mobile device of said first user entering said first check out lane of said entity for a transaction associated with second items from said entity;
fifth detecting at said second date and time, by said processor, that said first user is located at said first check out lane without any additional individuals previously associated with said first user and said first checkout lane; and
declining, by said processor based on said results of said fifth detecting, authorization for said first user for said transaction associated with said second items from said entity.

12. The method of claim 1, further comprising:
third detecting, by said processor, said mobile device of said first user at said first micro locations within an entity;
fourth detecting at a second date and time, by said processor, said mobile device of said first user entering said first check out lane of said entity for a transaction associated with second items from said entity;
fifth detecting at said second date and time, by said processor, that said first user is located at said first check out lane without any additional mobile devices previously associated with said first user and said first checkout lane; and
declining, by said processor based on said results of said fifth detecting, authorization for said user for said transaction associated with said second items from said entity.

13. The method of claim 1, further comprising:
generating, by said processor, a specialized memory repository within a specified portion of a hardware memory device of said hardware device; and
storing, by said processor within said specialized memory repository, said future authorization attributes.

14. The method of claim 1, further comprising:
transmitting, by said processor, said encrypted future authorization attributes to server devices associated with said entity.

15. The method of claim 1, further comprising:
providing at least one support service for at least one of creating, integrating, hosting, maintaining, and deploying computer-readable code in the hardware device, said code being executed by the processor to implement: said first detecting, said second detecting, said first authorizing, said analyzing, and said determining.

16. A frictionless authorization improvement method comprising:
first detecting, by a processor of a hardware device via Bluetooth beacons enabled by Bluetooth sensors, a mobile device of a first user at an entity, wherein said entity comprises locations comprising specialized hardware and software configured to implement frictionless authorization processes;
second detecting at a first date and time, by said processor, said mobile device of said first user entering a first check out lane of said entity for a transaction associated with first items from said entity;
detecting, by said processor via a retinal scan sensor, retinal authentication information retrieved from a retinal scan of said first user;
detecting, by said processor via a fingerprint detection sensor, fingerprint authentication information retrieved from a fingerprint scan of said first user;
third detecting at said first date and time, by said processor via an accelerometer of said mobile device, a height of said first user;
additionally detecting at said first date and time, by said processor, a heartrate of said first user;
first authorizing, by said processor in response to said retinal authentication information, said fingerprint authentication information, and biometric user input received via a plurality of biometric sensors, said first user for said transaction associated with said first items from said entity;
analyzing, by said processor, attributes associated with said additionally detecting, said first detecting, said second detecting, said third and said first authorizing;
determining, by said processor based on results of said analyzing, future authorization attributes for authorizing said mobile device of said first user for future transactions associated with items from said entity, wherein said future authorization attributes are associated with multifactor identification hardware sensor implemented processes;

generating, by said processor, a specialized memory repository within a specified portion of a hardware memory device of said mobile device;

encrypting, by said processor, said future authorization attributes resulting in encrypted future authorization attributes;

storing within said specialized memory repository, by said processor, said encrypted future authorization attributes;

sensing, by said processor via a plurality of wireless sensors, that said first user is not within a specified position with respect to said mobile device;

further sensing, by said processor via said plurality of wireless sensors, that an additional user is not within a specified position with respect to said mobile device, automatically deactivating, by said processor in response to results of said sensing and said further sensing, a hardware function of said mobile device;

activating, by said processor in response to said automatically deactivating, a function causing said mobile device to automatically emit an audio signal discernable within a threshold distance to said mobile device;

transmitting, by said processor in response to said automatically deactivating, a transmission, indicating a current location of said mobile device, to an authority entity thereby causing an individual of said authority entity to proceed to said current location determining authorization issues;

further detecting, by said processor, a current pattern of movement of said mobile device within said entity for comparison to previous patterns of movement of said mobile device within said entity;

further detecting, by said processor based on results of said activating and said further detecting, that said first user is within a specified position with respect to said mobile device; and executing, by said processor in response to results of said activating and said further detecting, a process for said authorizing said mobile device of said first user for said future transaction associated with items thereby causing said first user to pass through first micro locations within said entity and proceed to and enter said first check out lane of said entity for transaction associated with currently selected items from said entity, wherein said first micro locations comprise a first location associated with a first check out lane of said entity and a second location associated with an entrance of said entity; and further detecting, by said processor in response to said executing, that said mobile device has entered a proximity with respect to a specified checkout kiosk;

authorizing and processing, by said processor, an additional transaction based on said proximity, an association of said first user with the specified checkout kiosk, said retinal authentication information, and said fingerprint authentication information; and automatically presenting, by said processor, an indicator light and associated graphical user interface to said first user, wherein said indicator light and associated graphical user interface indicated said authorizing and processing.

17. The method of claim 16, further comprising:

third detecting at a second date and time, by said processor, said mobile device of said first user entering said first check out lane of said entity for said transaction associated with second items from said entity;

fourth detecting at said second date and time, by said processor via said accelerometer of said mobile device, said height of said first user; and first authorizing, by said processor based on said future authorization attributes with respect to results of said third detecting and said fourth detecting, said first user for said transaction associated with said second items from said entity.

18. The method of claim 16, further comprising:

third detecting at a second date and time, by said processor, said mobile device of said first user entering a second check out lane of said entity for a transaction associated with second items from said entity;

fourth detecting at said second date and time, by said processor via said accelerometer of said mobile device, said height of said user; and first authorizing, by said processor based on said future authorization attributes with respect to results of said third detecting and said fourth detecting, said first user for said transaction associated with said second items from said entity.

19. The method of claim 18, further comprising:

modifying, by said processor based on said first authorizing, said future authorization attributes in accordance with results of said third detecting and said fourth detecting resulting in modified future authorization attributes; and generating, by said processor, software code for executing said modified future authorization attributes.

20. The method of claim 16, further comprising:

third detecting at a second date and time, by said processor, said mobile device of said first user entering said first check out lane of said entity for a transaction associated with second items from said entity;

determining, by said processor, a time period elapsed since said determining said future authorization attributes; and comparing, by said processor, said time period to a predetermined threshold time period.

21. The method of claim 20, wherein results of said comparing indicate that said time period is less than said predetermined threshold time period, and wherein said method further comprises:

third detecting at said second date and time, by said processor via said accelerometer of said mobile device, said height of said first user; and first authorizing, by said processor based on said future authorization attributes with respect to results of said third detecting and said comparing, said first user for said transaction associated with said second items from said entity.

22. A computer program product, comprising a computer readable hardware storage device storing a computer readable program code, said computer readable program code comprising an algorithm that when executed by a processor of a hardware device implements a frictionless authorization improvement method, said method comprising:

first detecting, by said processor via Bluetooth beacons enabled by Bluetooth sensors, a mobile device of a first user at first micro locations within a entity, wherein said first micro locations comprise a first location associated with a first check out lane of said entity and a second location associated with an entrance of said entity, and wherein said first micro locations comprise specialized hardware and software configured to implement frictionless authorization processes;

second detecting at a first date and time, by said processor, said mobile device of said first user entering said first check out lane of said entity for a transaction associated with first items from said entity;
detecting, by said processor via a retinal scan sensor, retinal authentication information retrieved from a retinal scan of said first user;
detecting, by said processor via a fingerprint detection sensor, fingerprint authentication information retrieved from a fingerprint scan of said first user;
first authorizing, by said processor in response to said retinal authentication information, said fingerprint authentication information, and biometric user input received via a plurality of biometric sensors, said first user for said transaction associated with said first items from said entity;
analyzing, by said processor, attributes associated with said first detecting, said second detecting, and said first authorizing;
determining, by said processor based on results of said analyzing, future authorization attributes for authorizing said mobile device of said first user for future transactions associated with items from said entity, wherein said future authorization attributes are associated with multifactor identification hardware sensor implemented processes;
generating, by said processor, a specialized memory repository within a specified portion of a hardware memory device of said mobile device;
encrypting, by said processor, said future authorization attributes resulting in encrypted future authorization attributes;
storing within said specialized memory repository, by said processor, said encrypted future authorization attributes;
detecting, by said processor via a plurality of wireless sensors, that said first user is not within a specified position with respect to said mobile device;
automatically deactivating, by said processor in response to results of said detecting, a hardware function of said mobile device;
activating, by said processor in response to said automatically deactivating, a function causing said mobile device to automatically emit an audio signal discernable within a threshold distance to said mobile device;
transmitting, by said processor in response to said automatically deactivating, a transmission, indicating a current location of said mobile device, to an authority entity thereby causing an individual of said authority entity to proceed to said current location determining authorization issues;
further detecting, by said processor, a current pattern of movement of said mobile device within said entity for comparison to previous patterns of movement of said mobile device within said entity;
additionally detecting, by said processor based on results of said activating and said further detecting, that said user is within a specified position with respect to said mobile device;
executing, by said processor in response to results of said activating and said additionally detecting, a process for said authorizing said mobile device of said first user for said future transactions associated with items thereby causing said first user to pass through said first micro locations within said entity and proceed to and enter said first check out lane of said entity for a transaction associated with currently selected items from said entity;
further detecting, by said processor in response to said executing, that said mobile device has entered a proximity with respect to a specified checkout kiosk;
authorizing and processing, by said processor, an additional transaction based on said proximity, an association of said user with the specified checkout kiosk, said retinal authentication information, and said fingerprint authentication information; and
automatically presenting, by said processor, an indicator light and associated graphical user interface to said first user, wherein said indicator light and associated graphical user interface indicated said authorizing and processing.

23. The computer program product of claim 22, wherein said method further comprises:
third detecting, by said processor, said mobile device of said first user at said first micro locations within a retail entity;
fourth detecting at a second date and time, by said processor, said mobile device of said first user entering said first check out lane of said retail entity for purchase of second items from said retail entity; and
second authorizing, by said processor based on past authorization attributes with respect to results of said third detecting and said fourth detecting, said first user for said purchase of said second items from said retail entity.

24. A hardware device comprising a processor coupled to a computer-readable memory unit, said memory unit comprising instructions that when executed by the computer processor implements a frictionless authorization improvement method comprising:
first detecting, by said processor via Bluetooth beacons enabled by Bluetooth sensors, a mobile device of a first user at first micro locations within a entity, wherein said first micro locations comprise a first location associated with a first check out lane of said entity and a second location associated with an entrance of said entity, and wherein said first micro locations comprise specialized hardware and software configured to implement frictionless authorization processes;
second detecting at a first date and time, by said processor, said mobile device of said first user entering said first check out lane of said entity for a transaction associated with first items from said entity;
detecting, by said processor via a retinal scan sensor, retinal authentication information retrieved from a retinal scan of said first user;
detecting, by said processor via a fingerprint detection sensor, fingerprint authentication information retrieved from a fingerprint scan of said first user;
first authorizing, by said processor in response to said retinal authentication information, said fingerprint authentication information, and biometric user input received via a plurality of biometric sensors, said first user for said transaction associated with said first items from said entity;
analyzing, by said processor, attributes associated with said first detecting, said second detecting, and said first authorizing;
determining, by said processor based on results of said analyzing, future authorization attributes for authorizing said mobile device of said first user for future transactions associated with items from said entity, wherein said future authorization attributes are associated with multifactor identification hardware sensor implemented processes;
generating, by said processor, a specialized memory repository within a specified portion of a hardware memory device of said mobile device;
encrypting, by said processor, said future authorization attributes resulting in encrypted future authorization attributes;
storing within said specialized memory repository, by said processor, said encrypted future authorization attributes;
detecting, by said processor via a plurality of wireless sensors, that said first user is not within a specified position with respect to said mobile device;
automatically deactivating, by said processor in response to results of said detecting, a hardware function of said mobile device;
activating, by said processor in response to said automatically deactivating, a function causing said mobile device to automatically emit an audio signal discernable within a threshold distance to said mobile device;
transmitting, by said processor in response to said automatically deactivating, a transmission, indicating a current location of said mobile device, to an authority entity thereby causing an individual of said authority entity to proceed to said current location determining authorization issues;
further detecting, by said processor, a current pattern of movement of said mobile device within said entity for comparison to previous patterns of movement of said mobile device within said entity;
additionally detecting, by said processor based on results of said activating and said further detecting, that said user is within a specified position with respect to said mobile device;
executing, by said processor in response to results of said activating and said additionally detecting, a process for said authorizing said mobile device of said first user for said future transactions associated with items thereby causing said first user to pass through said first micro locations within said entity and proceed to and enter said first check out lane of said entity for a transaction associated with currently selected items from said entity;
further detecting, by said processor in response to said executing, that said mobile device has entered a proximity with respect to a specified checkout kiosk;
authorizing and processing, by said processor, an additional transaction based on said proximity, an association of said user with the specified checkout kiosk, said retinal authentication information, and said fingerprint authentication information; and
automatically presenting, by said processor, an indicator light and associated graphical user interface to said first user, wherein said indicator light and associated graphical user interface indicated said authorizing and processing.

25. A computer program product, comprising a computer readable hardware storage device storing a computer readable program code, said computer readable program code comprising an algorithm that when executed by a processor of a hardware device implements a frictionless authorization improvement method, said method comprising:
first detecting, by said processor via Bluetooth beacons enabled by Bluetooth sensors, a mobile device of a first user at an entity, wherein said entity comprises locations comprising specialized hardware and software configured to implement frictionless authorization processes;
second detecting at a first date and time, by said processor, said mobile device of said first user entering a first check out lane of said entity for a transaction associated with first items from said entity;
detecting, by said processor via a retinal scan sensor, retinal authentication information retrieved from a retinal scan of said first user;
detecting, by said processor via a fingerprint detection sensor, fingerprint authentication information retrieved from a fingerprint scan of said first user;
third detecting at said first date and time, by said processor via an accelerometer of said mobile device, a height of said first user;
additionally detecting at said first date and time, by said processor, a heartrate of said first user;
first authorizing, by said processor in response to said retinal authentication information, said fingerprint authentication information, and biometric user input received via a plurality of biometric sensors, said first user for said transaction associated with said first items from said entity;
analyzing, by said processor, attributes associated with said additionally detecting, said first detecting, said second detecting, said third and said first authorizing;
determining, by said processor based on results of said analyzing, future authorization attributes for authorizing said mobile device of said first user for future transactions associated with items from said entity, wherein said future authorization attributes are associated with multifactor identification hardware sensor implemented processes;
generating, by said processor, a specialized memory repository within a specified portion of a hardware memory device of said mobile device;
encrypting, by said processor, said future authorization attributes resulting in encrypted future authorization attributes;
storing within said specialized memory repository, by said processor, said encrypted future authorization attributes;
sensing, by said processor via a plurality of wireless sensors, that said first user is not within a specified position with respect to said mobile device;
further sensing, by said processor via said plurality of wireless sensors, that an additional user is not within a specified position with respect to said mobile device,
automatically deactivating, by said processor in response to results of said sensing and said further sensing, a hardware function of said mobile device;
activating, by said processor in response to said automatically deactivating, a function causing said mobile device to automatically emit an audio signal discernable within a threshold distance to said mobile device;
transmitting, by said processor in response to said automatically deactivating, a transmission, indicating a current location of said mobile device, to an authority entity thereby causing an individual of said authority entity to proceed to said current location determining authorization issues;
further detecting, by said processor, a current pattern of movement of said mobile device within said entity for comparison to previous patterns of movement of said mobile device within said entity;

further detecting, by said processor based on results of said activating and said further detecting, that said first user is within a specified position with respect to said mobile device; and executing, by said processor in response to results of said activating and said further detecting, a process for said authorizing said mobile device of said first user for said future transaction associated with items thereby causing said first user to pass through first micro locations within said entity and proceed to and enter said first check out lane of said entity for transaction associated with currently selected items from said entity, wherein said first micro locations comprise a first location associated with a first check out lane of said entity and a second location associated with an entrance of said entity; and further detecting, by said processor in response to said executing, that said mobile device has entered a proximity with respect to a specified checkout kiosk;

authorizing and processing, by said processor, an additional transaction based on said proximity, an association of said first user with the specified checkout kiosk, said retinal authentication information, and said fingerprint authentication information; and automatically presenting, by said processor, an indicator light and associated graphical user interface to said first user, wherein said indicator light and associated graphical user interface indicated said authorizing and processing.

\* \* \* \* \*